United States Patent [19]
Ghaibeh et al.

[11] Patent Number: 5,926,478
[45] Date of Patent: Jul. 20, 1999

[54] DATA TRANSMISSION OVER A POINT-TO-MULTIPOINT OPTICAL NETWORK

[75] Inventors: Gihad Ghaibeh, Berkeley; John Randall, Fremont, both of Calif.

[73] Assignee: Ericsson, Inc., Menlo Park, Calif.

[21] Appl. No.: 08/826,633

[22] Filed: Apr. 3, 1997

Related U.S. Application Data

[63] Continuation-in-part of application No. 08/772,088, Dec. 19, 1996.

[51] Int. Cl.$^6$ .......................... H04L 12/403; H04H 1/02
[52] U.S. Cl. ...................... 370/395; 370/449; 370/486; 348/7; 348/12
[58] Field of Search ................................ 370/337, 346, 370/347, 348, 432, 436, 442, 449, 480, 485, 489, 486, 503, 395; 348/6, 7, 12, 13; 340/825.07, 825.08

[56] References Cited

U.S. PATENT DOCUMENTS

| | | | |
|---|---|---|---|
| 5,295,140 | 3/1994 | Crisler et al. | 370/443 |
| 5,297,144 | 3/1994 | Gilbert et al. | 370/346 |
| 5,317,571 | 5/1994 | Marcel et al. | 370/103 |
| 5,355,368 | 10/1994 | Dore et al. | 370/95.3 |
| 5,426,636 | 6/1995 | Hiller et al. | 370/60 |
| 5,499,241 | 3/1996 | Thompson et al. | 370/486 |
| 5,568,482 | 10/1996 | Li et al. | 370/471 |
| 5,576,874 | 11/1996 | Czerwiec et al. | 359/123 |
| 5,606,555 | 2/1997 | Singer | 370/465 |
| 5,768,279 | 6/1998 | Barn et al. | 370/486 |

OTHER PUBLICATIONS

Plas, G. Van Der et al: "ATM Over Passive Optical Networks: System Design and Demonstration" Fiber Networks for Voice, Video & Multimedia Services Proceedings, Nov. 19, 1992, Boston MA, vol. 1786, Jan. 1, 1992, pp. 48–57, XP000443958 see pg. 50 line 16–17*sec. 2.2.2,2.2.3,3.1.

Breeman, Van J et al: "Asynchronous Transfer Mode Over A Passive Optical Network: The Realization of High Speed Demonstrator System" International Journal of Optoelectronics (Incl. Optical Computing & Processing), vol. 11, No. 1, Jan. 1997, pp. 71–84, XP000639630 *sections 3.2* see p. 74, col. 1, line 24–p. 77, col. 2, line 10; figures 3,4.

(List continued on next page.)

*Primary Examiner*—Chau Nguyen
*Assistant Examiner*—Soon-Dong Hyun
*Attorney, Agent, or Firm*—Lyon & Lyon LLP

[57] ABSTRACT

A data transmission protocol for use in an ATM-based point-to-multipoint passive optical network having a headend facility and a plurality of downstream network units, wherein downstream data is transmitted in serial data frames comprising one hundred eighty, fifty-four byte downstream slots, including two framing slots and one hundred seventy-eight ATM cell slots, which are transmitted every 125 μsec for an overall downstream bit rate of 622.08 Mbps. Upstream data transmission is provided on a "permit" basis controlled by the headend based on monitoring ATM cell queue sizes at respective network units, wherein each downstream frame slot includes a one byte MAC overhead header field for transmitting upstream transmission permits allocated over twenty bit permit fields, for a total of seventy-two upstream permits allocated per downstream frame. Upstream data is transmitted from an individual network units in five hundred forty bit upstream data slots, each upstream slot having a preamble portion and a payload portion, i.e., with seventy-two upstream slots are transmitted every 125 μsec, thereby forming upstream frames received at the headend at a data rate of 311.04 Mbps. Upstream bandwidth permits are based on a selected set of service priorities, wherein the respective permits specify which ATM service type is to be transmitted.

11 Claims, 15 Drawing Sheets

OTHER PUBLICATIONS

Angelopoulos, J. D. et al: "Transparent MAC Method for Bandwidth Sharing and CDV Control at the ATM Layer of Passive Optical Networks" Journal of Lightwave Technology, vol. 14, No. 12, Dec.1996, pp. 2625–2634, XP000642251* sections 3,4,5* see figure 2.

Angelopoulos, J.D. et al: "A MAC Protocol for an ATM Based SuperPON" Proceedings of the SPIE, vol. 2919, 1996, pp. 279–287, XP002064023, see p. 2626, col. 1, line 3—col. 2, line 12; fig. 1, see p. 2628, col. 1, line 11–col, 2, line 8; figure 2.

*Access to B–ISDN Via PONS: ATM Communication in Practice*, edited by Ulrich Killat, pub. by Wiley and Teubner, 1996, pp. I–XX, 1–308.

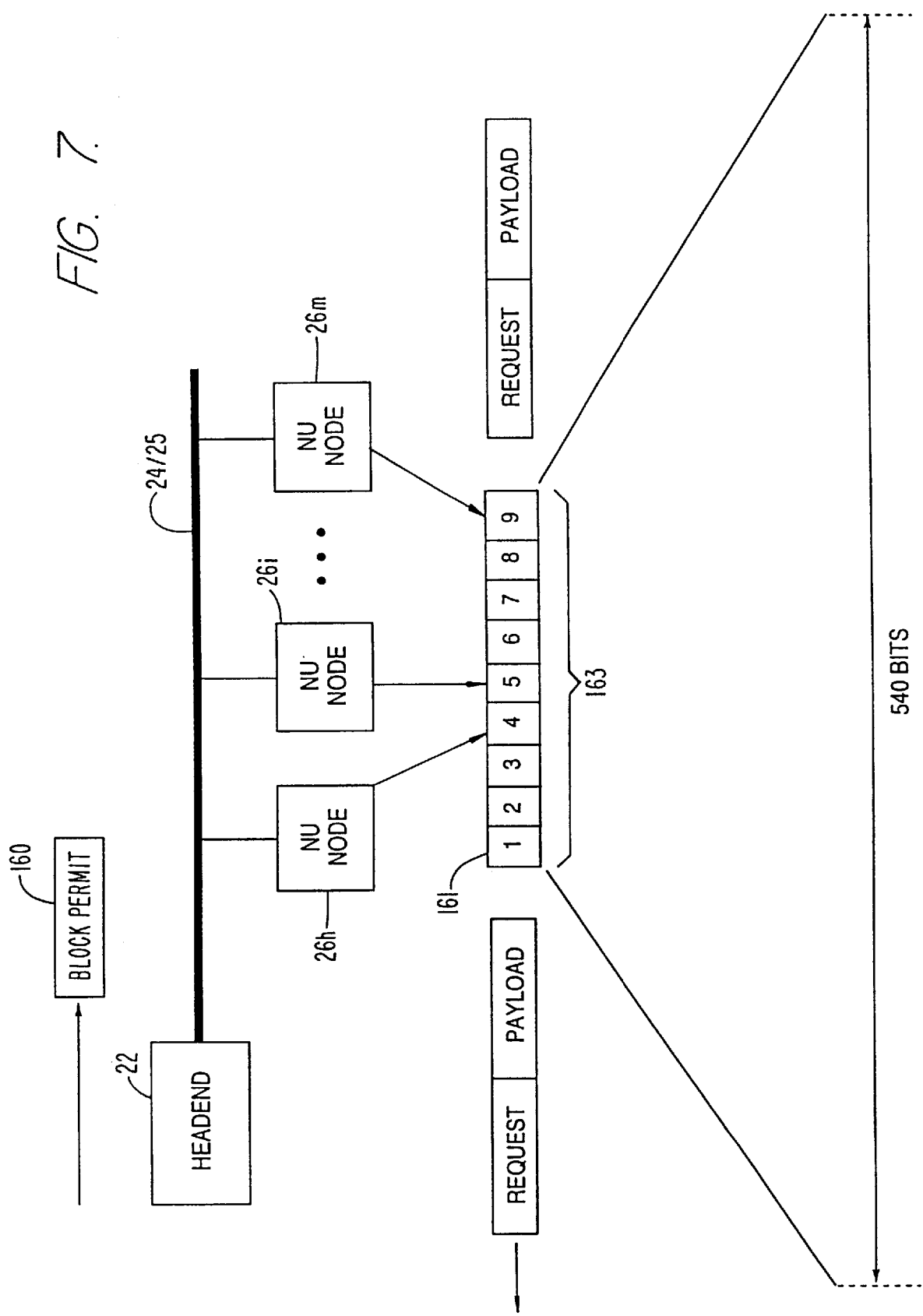

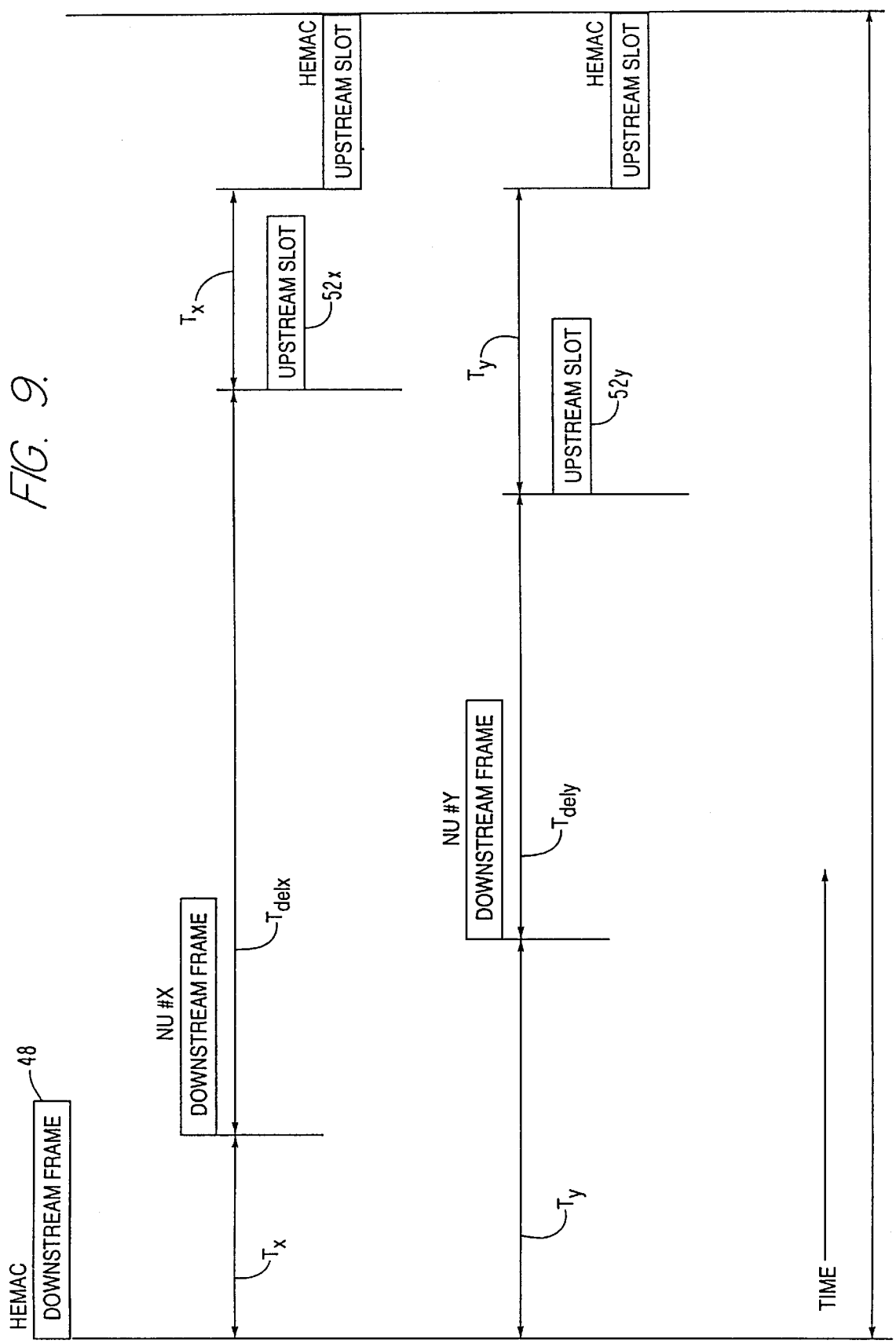

DATA TRANSMISSION OVER A POINT-TO-MULTIPOINT OPTICAL NETWORK

RELATED APPLICATION DATA

This application is a C-I-P of co-pending U.S. application Ser. No. 08/772,088, filed Dec. 19, 1996, and entitled "Network Architecture for Broadband Data Communication Over a Shared Medium," which is related to co-pending U.S. application Ser. No. 08/677,160 filed Jul. 9, 1996, and entitled "Protocol for Broadband Data Communication Over a Shared Medium," both of which are fully incorporated herein by reference.

FIELD OF THE INVENTION

The present invention pertains to the field of communication networks, including apparatus and data transmission protocols for the transport of digital data over a shared point-to-multipoint broadband access network.

BACKGROUND OF THE INVENTION

Much activity is presently being directed into the design and deployment of "point-to-multipoint" broadband access networks, wherein downstream signals are broadcast from a single head-end facility to multiple end user stations (i.e., via "point-to-multipoint" transmission), and upstream signals are transmitted from each respective end users to the head end facility (i.e., via "point-to-point" transmission), respectively. It presently anticipated that point-to-multipoint broadband access networks will be employed to support a variety of independent communication services, such as, e.g., traditional two-way telecommunications, broadcast video (i.e., CATV) services and a full range of digital baseband services.

Given the wide variety of potential communication services to be supported over point-to-multipoint network broadband access networks, it is desirable to provide efficient digital data transmission protocols for supporting both the downstream and upstream communication paths. Notably, such networks are well suited to support asynchronous transfer mode ("ATM") based data transmission, whereby data packets or "cells" are periodically assembled and transmitted from a sending node, and received and disassembled at a receiving node. In particular, ATM transmission enables the transmission of multiple services over a single communication path, whereby individual service bandwidth utilization may be optimized as a function of the statistical activity of each individual service.

The use of relatively low noise, high speed point-to-multipoint optical networks to support the two-way transmission of a wide variety broadband data services is especially desirable in that optical networks are capable of transporting relative large amounts of data in short time periods. However, in order to fully utilize the high speed, low noise environment provided by an optical network, the selected data transmission protocol(s) should be compatible with existing optical transmission standards, should most fully utilize the available carrier channel bandwidth, and should conform with applicable ATM transmission protocols.

Thus, it would be desirable to provide a network architecture and data communication protocol that will dynamically and adaptively allocate network bandwidth to a number of communication nodes sharing a common point-to-multipoint communication network, such as a relatively high speed, low noise, passive optical network, while simultaneously supporting multiple types of ATM data traffic.

SUMMARY OF THE INVENTION

The present invention provides network architectures and data communication protocols that support both downstream and upstream transmission of digital data in an ATM-based, point-to-multipoint broadband access network, such as a relatively low noise, high speed passive optical network ("PON").

In a preferred embodiment, a point-to-multipoint PON includes a headend facility that transmits and receives digital data over respective downstream and upstream optical fiber distribution networks to and from a plurality of network units ("NUs"). In particular, the headend includes a Head-End Media Access Controller ("HEMAC"), which controls the transport of various multi-priority ATM cells between the headend and the respective NUs, wherein downstream transmission is via point-to-multipoint broadcast from the headend to all active NUs, and upstream transmission is via individual point-to-point transmission from the respective NUs to the headend.

In accordance with a general aspect of the invention, downstream data is transmitted in serially transmitted downstream data frames, wherein all downstream data frames are received by all active NUs of the PON. Each downstream frame comprises one hundred eighty, fifty-four byte downstream slots, including two framing slots and one hundred seventy-eight ATM cell slots, which are transmitted every 125 μsec for an overall downstream bit rate of 622.08 Mbps. Upstream data transmission is provided on a "permit" basis controlled by the headend based on monitoring ATM cell queue sizes at respective NUs. In particular, each downstream frame slot includes a one byte MAC overhead header field, for a total of 180 bytes per downstream frame used for transporting the upstream transmission permits. In a presently preferred embodiment, individual permits are allocated over twenty bit permit fields in the MAC overhead bytes, for a total of seventy-two upstream permits allocated per downstream frame.

Upon receipt of respective permits, upstream data is transmitted from an individual NUs in five hundred forty bit upstream data slots, each upstream slot having a preamble portion and a payload portion, i.e., with seventy-two upstream slots are transmitted every 125 μsec, thereby forming upstream frames received at the headend at a data rate of 311.04 Mbps. Upstream frame transmission timing is thus identical to the downstream frame transmission timing, i.e., based on 125 μsec frame intervals, with an individually calculated upstream transmission delay is imposed at each NU so that the upstream frame slots are received serially at the headend facility, without interfering with each other.

In accordance with a still further general aspect of the invention, the HEMAC allocates upstream bandwidth permits to respective NUs based on a selected set of service types and transmission priorities, wherein the respective permits specify which ATM service type is to be transmitted. Generally, permits are issued by the HEMAC on a "polling" or "reserved" basis, i.e., whereby permits are targeted to specific NUs. In presently preferred embodiment, permits are also issued based on specific types of upstream data to be transmitted, whereby priority may be given to certain services requiring low cell delay variation ("CDV"), such as synchronous telephony traffic. In response to a received ATM cell permit, the recipient NU transmits an upstream ATM payload cell in the payload portion of the upstream slot, as well upstream "request" information, which contains a status count of the number of ATM cells awaiting upstream transmission, divided into respective service priority types.

Upstream transmission permits also include "ranging" permits for allowing the HEMAC to determine, and adjust for, respectively, the requisite transmission delay of a respective NU, and "block polling" permits, which enable the headend to receive updated ATM cell queue information from a selected group of NUs in a single upstream slot (i.e., without the respective ATM payload cells).

Thus, a general object of the invention is to provide a data transmission protocol that supports the two-way (asymmetrical) transport of multi-priority ATM cells between a headend facility and respective NUs of a point-to-multipoint passive optical network, by providing real-time allocation of multi-priority upstream ATM traffic types, depending upon actual demand and service priority.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which:

FIG. 7 is a block diagram of a preferred upstream data slot transmitted by a selected group of network units in response to a block polling permit;

FIG. 9 is a simplified illustration of the variable upstream transmission delay of the respective network units in the PON of FIG. 1;

DETAILED DESCRIPTION OF THE PREFERRED EMBODIMENTS

Figure 1:
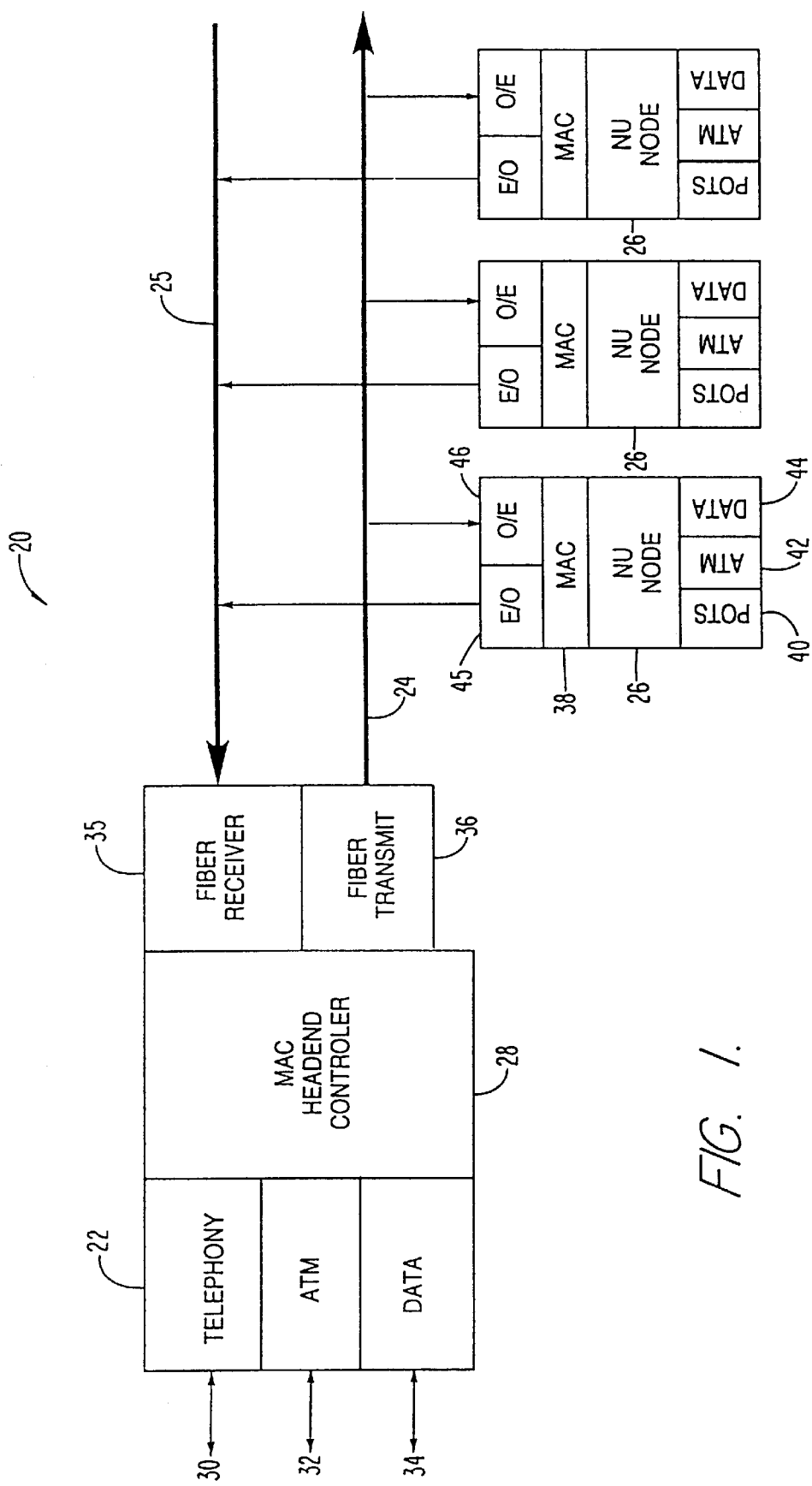
FIG. 1 is a block diagram of an exemplary preferred point-to-multipoint PON, including a headend broadcast facility connected with a plurality of NUs via respective downstream and upstream fiber distribution networks.

Referring to FIG. 1, a point-to-multipoint broadband access PON 20 includes a headend facility 22 that transmits and receives digital data to and from a plurality of NUs 26 over respective downstream and upstream optical fiber distribution networks 24 and 25. The headend 22 includes a HeadEnd Media Access Controller (HEMAC) 28, which controls the transport of various digital data streams between the headend 22 and the respective NUs 26. In particular, downstream transmission in the PON 20 is via point-to-multipoint broadcast from the headend 22 to all (active) NUs 26 over the downstream fiber network 24, and upstream transmission is via individual point-to-point transmission from the respective NUs 26 to the headend 22 over the upstream fiber network 25.

At the headend 22, a plurality of service interfaces, including a synchronous telephony interface 30, an ATM interface 32 and a digital baseband services interface 34, individually transmit and receive digital data to and from, respectively, the HEMAC 28. The headend 22 is also equipped with an electro-optical transmitter 36 and receiver 35, respectively, for transmitting and receiving signals to and from the downstream and upstream fiber networks 24 and 25, respectively.

Each NU 26 is equipped with its own Media Access Controller (NU MAC) 38 for processing the digital data streams transmitted between the respective NU 26 and the HEMAC 28, and preferably supports one or more of the digital data services handled by the headend 22. For example, in the illustrated preferred embodiment, each NU 26 is equipped with a synchronous telephony interface 40, an ATM interface 42 and a digital baseband services interface 44, each of which individually transmit and receive digital data to and from, the respective NU MAC 38. As will be apparent to those skilled in the art, however, there is no requirement that any given NU 26 necessarily be equipped to handle all of the particular data services supported by the headend 22. Each NU 26 is also equipped with its own electro-optical transmitter 45 and receiver 46, respectively, for transmitting and receiving signals onto and from the upstream and downstream fiber networks 25 and 24, respectively.

Figure 2:
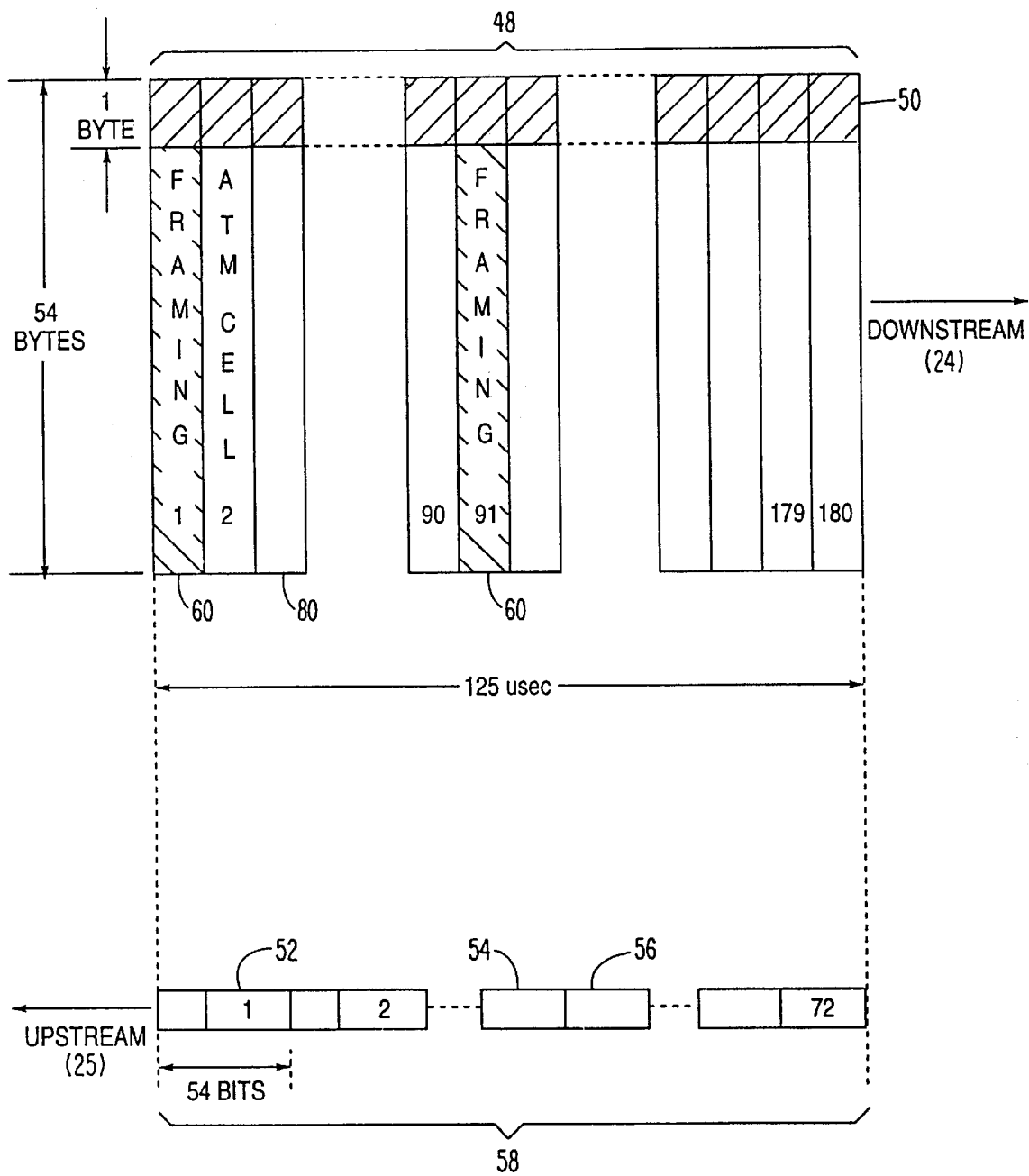
FIG. 2 is a block diagram depicting respective preferred downstream and upstream digital data frame formats for use in the communication network of FIG. 1.

Referring to FIG. 2, downstream data is transmitted from the headend 22 in successive (i.e., serially transmitted) downstream data frames 48, with all downstream data frames 48 received by each active NU 26 of the PON 20. Each downstream frame 48 comprises one hundred eighty, fifty-four byte downstream slots, including two framing slots 60 (i.e., slots "1" and "91"), and one hundred seventy-eight ATM cell slots 80 (slots "2"–"90" and "92"–"180"), with a complete downstream frame 48 transmitted every 125 μsec for an overall downstream bit rate of 622.08 Mbps. In accordance with a general aspect of the invention, all downstream frame slots 1–180 include a one byte MAC overhead header 50 used for transporting upstream bandwidth permit information, plus fifty-three bytes payload data, i.e., one standard ATM cell in the case of the ATM cell slots 2–90 and 92–180.

Upstream data is transmitted by individual NUs 26 in successive (i.e., serially transmitted) five hundred forty bit upstream data slots 52, each upstream slot generally comprising a preamble portion 54 and a payload portion 56, with seventy-two upstream slots transmitted every 125 μsec to form upstream data frames 58 received at the headend 22 at an upstream bit rate of 311.04 Mbps. As will be appreciated by those skilled in the art, and as is described in greater detail herein, because the upstream slots 52 are transmitted on a point-to-point basis, instead of on a point-to-multipoint basis, each slot will have a greater average overhead per ATM payload data cell than will the downstream slots. As will also be apparent to those skilled in the art, an advantage of employing an upstream bit rate that is evenly divisible into the downstream bit rate is that network clock synchronization of the PON 20 is relatively easy to maintain, even though the bit rates (and slot sizes) in the two directions are different. Thus, a significant advantage of the preferred downstream and upstream framing formats provided by the present invention is that they provide for synchronous network timing of asymmetrical downstream and upstream data flows.

Figure 3:
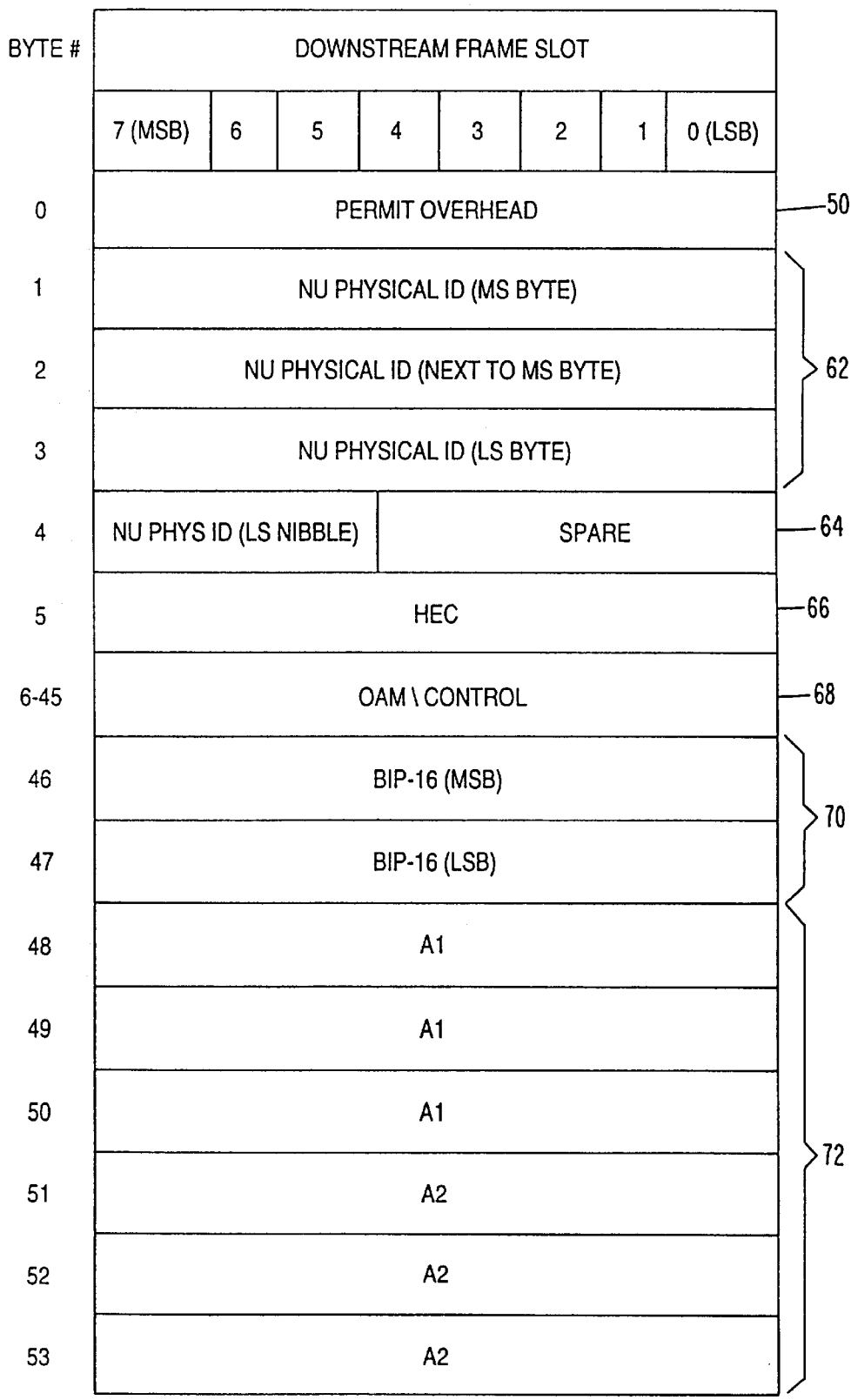
FIG. 3 is a table depicting a preferred framing slot in the downstream data frame of FIG. 2.

Referring to FIG. 3, each downstream framing slot 60 includes a one byte MAC overhead permit field 50; a twenty-eight bit NU physical ID field 62 used to identify specific NUs 26 by their unique serial number (i.e., the manufacturer's assigned MAC address), wherein the physical ID field is used in order to alert the identified NU that it is a recipient of further information contained in a forty byte OAM/Control field 68; four spare bits 64; a one byte of header error correction ("HEC") 66; two bytes bit interleave parity ("BIP") 70 for checking the integrity of the forty bytes OAM/Control information field 68; and six consecutive framing bytes 72 used to synchronize the respective NU optical receivers 46. Use of the MAC Overhead permit and OAM/Control fields 50 and 68, respectively, is described below in greater detail.

Figure 4:
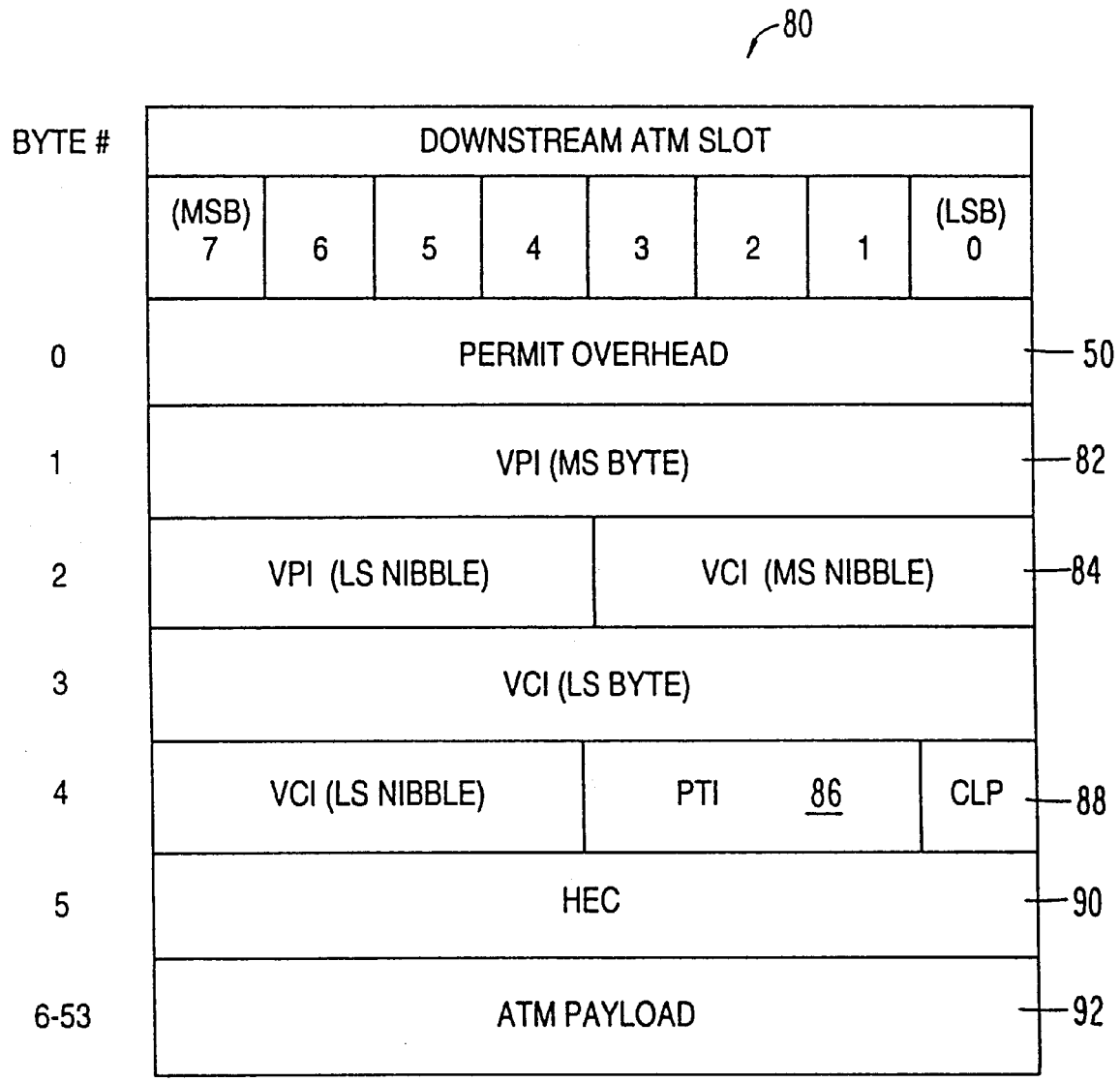
FIG. 4 is a table depicting a preferred ATM slot in the downstream data frame of FIG. 2.

Referring to FIG. 4, the downstream ATM slots 80 each include the one byte MAC overhead permit field 50, followed by a fifty-three byte ATM cell formatted in accordance with the ATM forum standards. In particular, the fifty-three byte ATM cell includes a twelve bit virtual path identifier ("VPI") field 82; a sixteen bit virtual circuit identifier ("VCI") field 84; a three bit payload type identifier ("PTI") field 86; a one bit cell loss priority ("CLP") field 88 (i.e., set either to high or low, depending on the type of payload data contained in the cell); one byte of HEC information 90; and a forty-eight byte ATM payload cell 92. As will be apparent to those skilled in the art, the VPI and VCI fields 82 and 84 are evaluated by the NUs 26 to determine whether they are intended recipients of the respective ATM payload cell 92.

Figure 5:
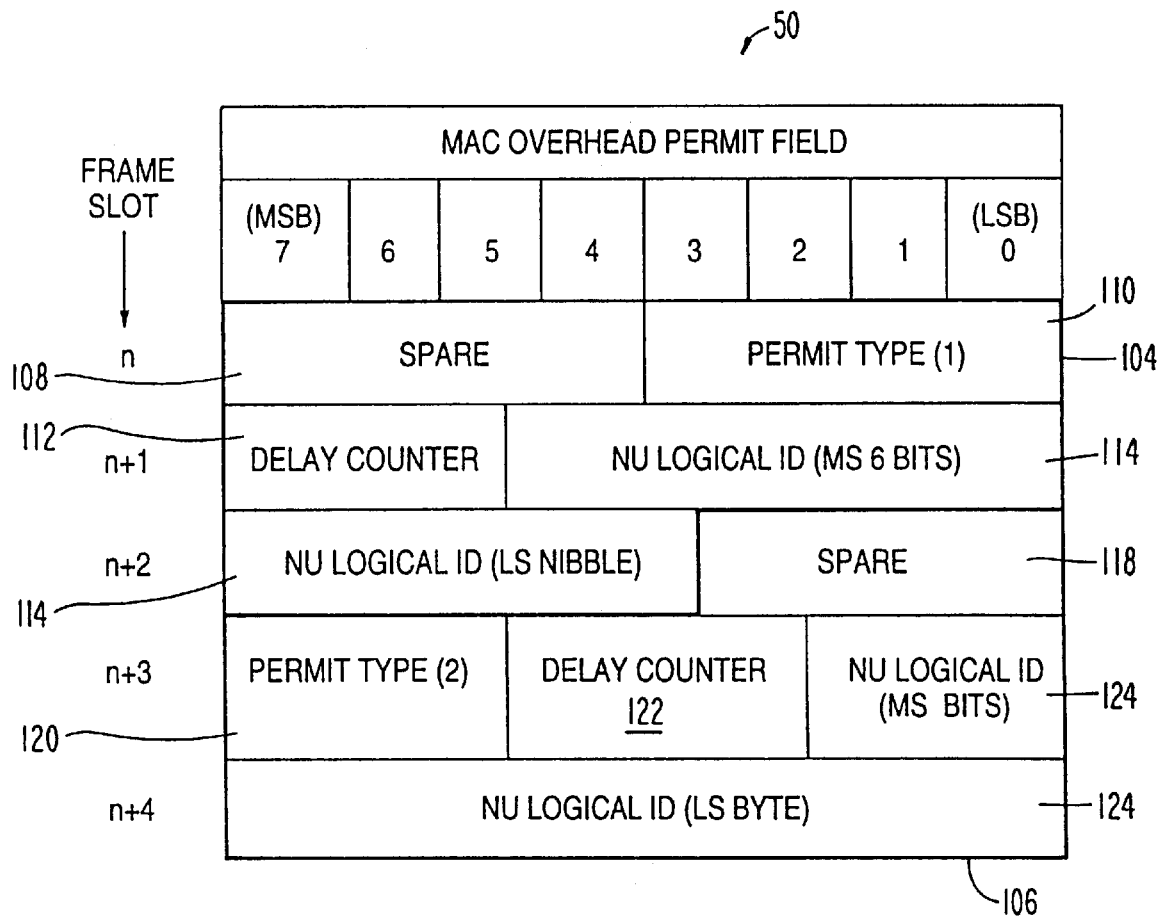
FIG. 5 is a table depicting a preferred upstream transmission permit fields transported in the MAC overhead bytes of the downstream data frame of FIG. 2.

Referring to FIG. 5, upstream transmission bandwidth is allocated by the HEMAC 28 in twenty bit "permits" distributed over the MAC overhead permit field 50 of the downstream frames 48 i.e., whereby a total of (180 bytes * 8 bits/byte /20 bits/permit=) seventy-two permits are allocated during each downstream data frame 48. By way of illustration, the one byte MAC overhead permit field 50 for five consecutive downstream slots n to n+4 is shown in FIG. 5, whereby a first permit 104 is carried in the MAC overhead permit field 50 of slots n and n+1, plus the first half of the MAC overhead permit field 50 of slot n+2, and a second permit 106 is carried in the second half of the MAC overhead permit field 50 of slot n+2, plus the MAC overhead permit field 50 of slots n+3 and n+4, respectively.

In particular, each upstream transmission permit 104 and 106 comprises four spare bits, 108 and 118, a four bit "permit type" field, 110 and 120, a two bit "delay counter" field, 112 and 122, and a ten bit NU logical ID field, 116 and 126, respectively. The four bit permit type field (110 and 120) is used to identify what type of upstream transmission is allowed by a specified NU 26 in response to the permit. In most cases, the permit type will provide for the upstream transmission of a specified service priority ATM cell, such as, e.g., high priority continuous bit rate ("CBR") services, medium priority available bit rate ("ABR") services, or lower priority variable bit rate ("VBR") services. In a presently preferred embodiment, the first field, i.e., "0000", is used to indicate no upstream transmission is allowed i.e., whereby the corresponding upstream slot will be empty. With four bit positions available in the permit type field (110 and 120), up to fifteen possible permit types may also be specified.

The delay counter field (112 and 122) is used to either increment or decrement a respective upstream transmission delay counter (not shown) in a specified NU 26, which is discussed in greater detail below. In a presently preferred embodiment, "00" is used to indicate the present delay value is to be held; "01" is used to indicate that the present delay value should be decremented; and "10" is used to indicate that the present delay value should be incremented.

The ten bit NU logical ID field (114 and 124) is used to identify which NU 26 is the recipient of the respective permit. In a presently preferred embodiment, a unique ten bit logical ID is assigned to each active NU 26 of network 20, based either on an initial listing of the twenty-eight bit physical ID of each active NU in the HEMAC 28, or on a subsequent sign-on procedure, or both, wherein the HEMAC 28 transmits the assigned ten bit logical ID in the OAM/Control field 68 of a framing slot 60, after identifying the recipient in the NU physical ID field 62. In order to identify newly activated NUs 26 and assign to them their ten bit logical IDs, the HEMAC 28 periodically transmits a "sign-on" broadcast physical ID in field 62, wherein any newly active NU can identify itself to the HEMAC 28 by sending its twenty-eight bit physical ID via an out-of-band signal back to the HEMAC 28 (e.g., over the upstream fiber network 25 at an alternate frequency than the upstream slots 52). The HEMAC 28 will then transmit an assigned ten bit logical ID to the respective, newly active NU 26 in the OAM/Control field 68 of an ensuing framing slot 60. Notably, the ten bit logical ID field (114 and 124) may also be used to indicate that there is no intended recipient of the permit, e.g., with all zeros, or that the permit is for a specified polling group of NUs, as explained in greater detail below in conjunction with FIG. 7.

Figure 6:
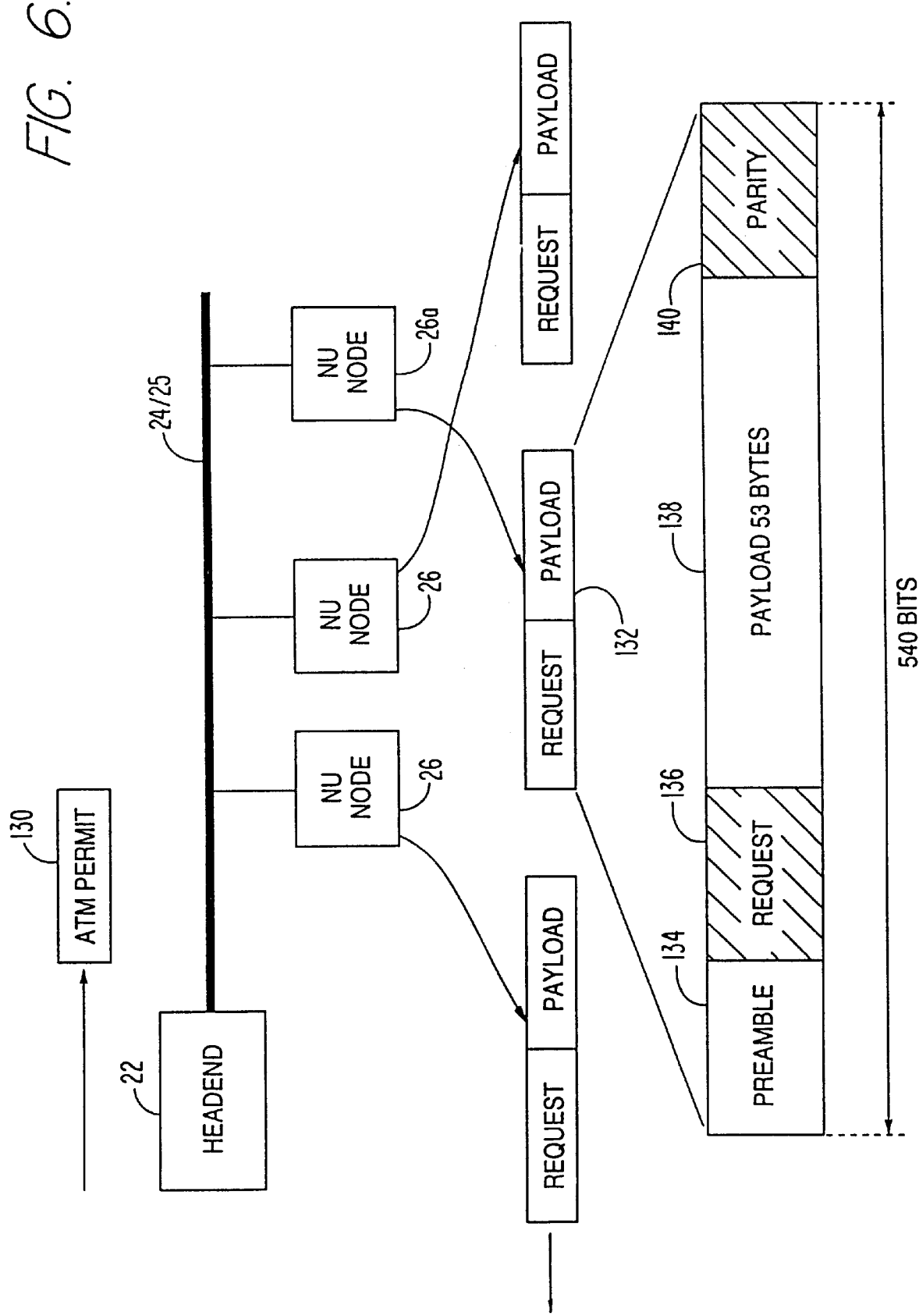
FIG. 6 is a block diagram of a preferred upstream data slot transmitted by a selected network unit in response to an ATM transmission permit.
Figure 6A:
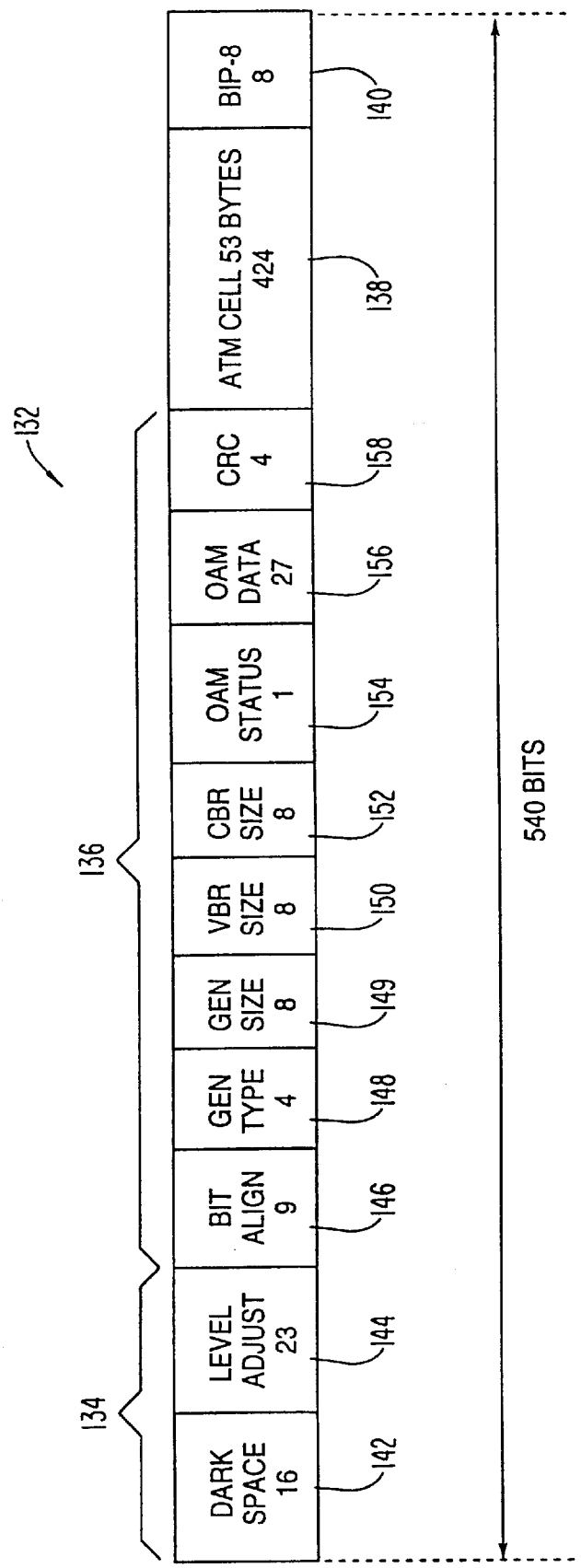
FIG. 6A is a more detailed block diagram of the preferred upstream data slot depicted in FIG. 6.

Referring to FIG. 6, in response to a "generic" ATM permit 130 of which it is the identified recipient, a selected NU 26a transmits a five hundred forty bit upstream ATM slot 132 (i.e., corresponding to the "generic" upstream slot 52 illustrated in FIG. 2), which generally includes a preamble portion 134, a "request" portion 136, an ATM payload cell 138, and a parity byte 140, respectively. More particularly, as seen in FIG. 6A, the preamble portion 134 of the upstream ATM slot 132 includes a two byte guard (or dark) space 142, followed by a twenty-three bit optical level adjust pattern (i.e., for adjusting the slicing level of the headend optical receiver 35), and a nine bit alignment pattern for clock recovery and synchronization, respectively. More detailed disclosures of respective methods and apparatus for the adjusting the optical receiver slicing level and received data bit (i.e., clock) alignment are provided in U.S. patent application Ser. Nos. 08/608,166, entitled "DC Coupled receiver for Shared Optical System," filed Mar. 20, 1996, now U.S. Pat. No. 5,801,867 and 08/787,849, entitled "Digital Phase Acquisition with Delay Locked Loop," filed Jan. 22, 1997, each of which are fully incorporated herein by reference.

The request portion 136 of the upstream ATM slot includes the status of up to three different ATM cell queues located at the respective responding NU 26, along with up to twenty seven bits of OAM data requiring transport to the HEMAC 28. In particular, the request portion 136 includes a first pair of "generic" data fields 148 and 149 for sending updated information regarding a specified service priority ATM queue, wherein field 148 provides a four bit "queue type" (i.e., for identifying up to sixteen different service priority queue types) and field 149 includes an eight bit queue size containing the number of ATM cells waiting in the service queue identified in field 148. Likewise, data field 150 carries an eight bit queue size field for VBR priority service and field 152 carries an eight bit queue size field for CBR priority service. In a manner described in greater detail below, the respective queue size fields 149, 150 and 152 are used to update registers (shown in FIG. 11) maintained at the HEMAC 28 as part of the process for allocating upstream bandwidth permits. The request portion 134 also includes an OAM status bit 154, which indicates whether any OAM data is carried in an immediately following twenty-seven bit OAM data field 156, and a four bit CRC field 158.

Referring to FIG. 7, in addition to the regular upstream bandwidth ATM permits 130, the HEMAC 28 will periodically send a block polling permit 160, wherein the logical ID field (e.g., 114 and 124 in FIG. 5) is used to identify a selected group of NUs 26 requested to respond. In particular, through the OAM/Control field 68 in the downstream framing slots 60, the HEMAC 28 will assign up to nine NUs 26 into respective block polling groups, wherein each NU 26 is given both a polling group ID and its respective response order within its assigned group. When a group polling permit 160 is received, the identified group of NUs 26 will each transmit a responsive sixty bit "mini-slot" 161 (i.e., "mini" in that there is no payload ATM cell attached), whereby nine collective mini-slots 161 (whether assigned or left empty) form a five hundred forty bit upstream block polling response slot 163. By way of the example shown in FIG. 7, NUs 20 26h, 26i and 26m each belong to a selected block polling group identified in a received block polling permit 160, wherein NU 26h is assigned to the fourth upstream mini-slot 161-(4), NU 26i is assigned to the fifth upstream mini-slot 161-(5), and NU 26m is assigned to the ninth upstream mini-slot 161-(9), respectively.

Figure 7A:
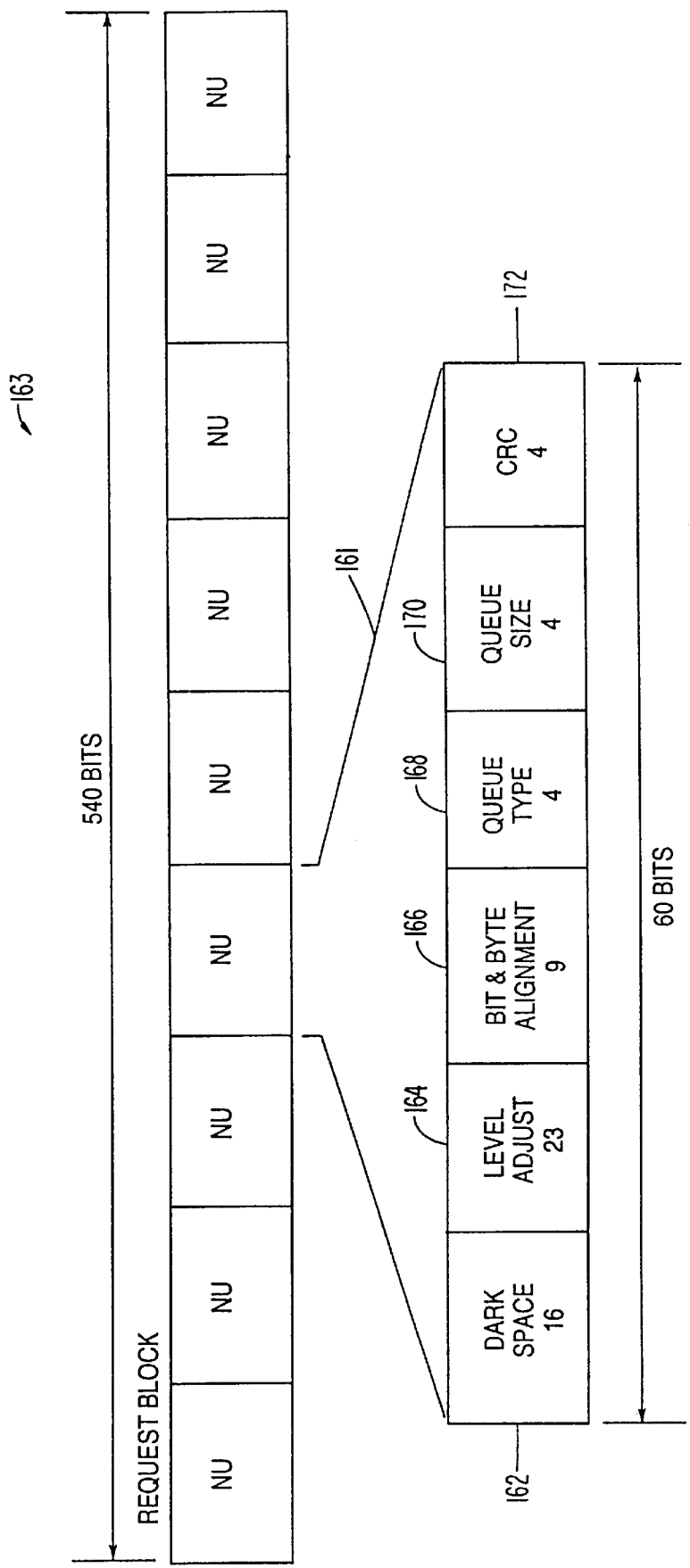
FIG. 7A is a more detailed block diagram of the preferred upstream data slot depicted in FIG. 7.

As seen in FIG. 7A, each sixty bit mini-slot 161 includes a two byte guard space 162, followed by a twenty-three bit level adjust and a nine bit alignment fields 164 and 166. Because of bit space constraint inherent in a mini-slot 161, information for only a single ATM service queue is identified by way of four bit queue type and size fields 168 and 170, respectively. A four bit CRC field is also included. As will be appreciated by those skilled in the art, an advantage of the block polling permits 160 is that they may be used by the HEMAC 28 to reserve a portion of the available upstream bandwidth exclusively for one or more specifically targeted NUs 26 on a predetermined basis. Block polling permits 160 are thus especially advantageous in heavy network traffic conditions in that they insure that all NUs 26 will have at least some opportunity to update the HEMAC 28 with information regarding a critical service priority queue.

Figure 8:
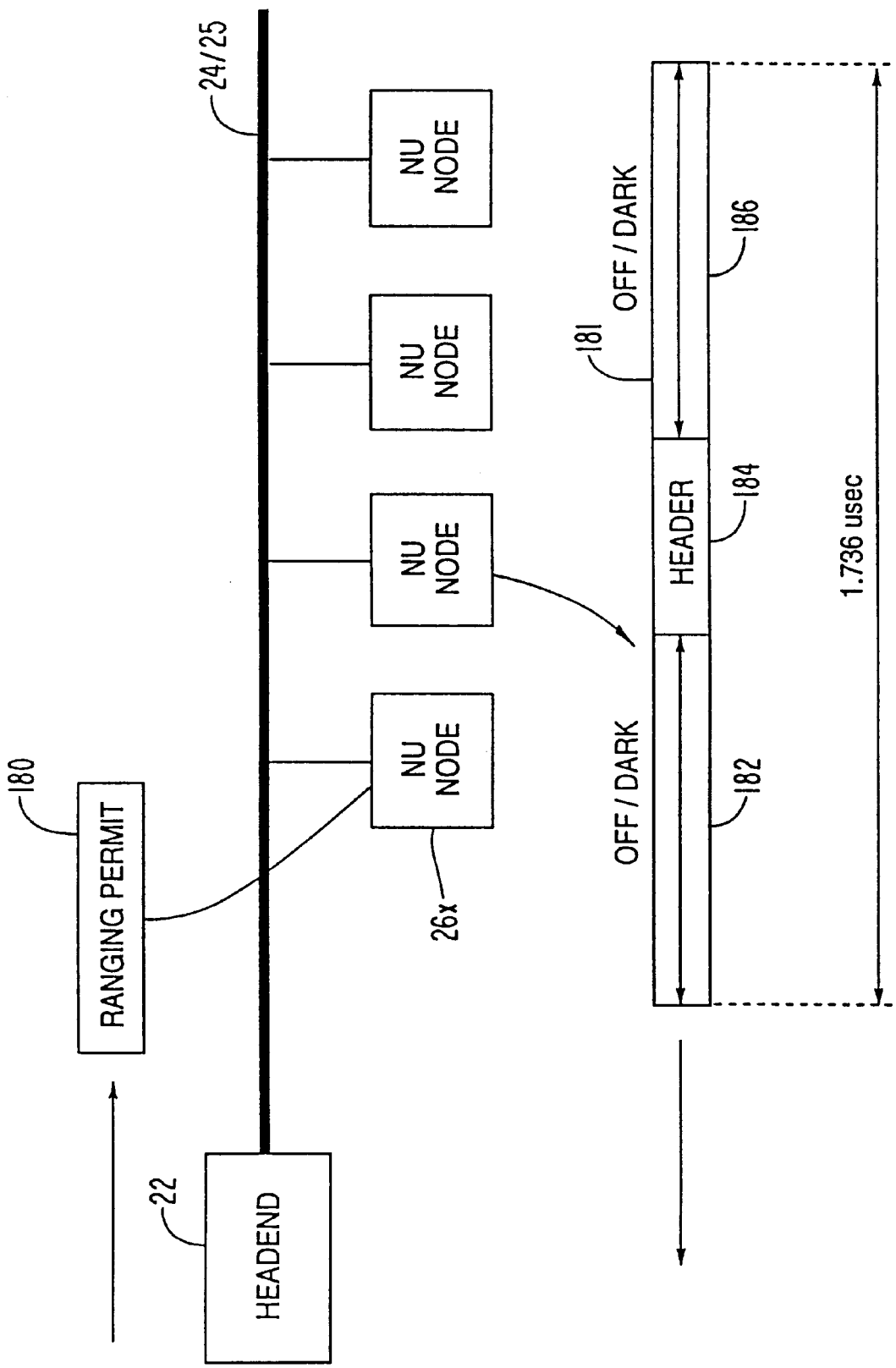
FIG. 8 is a block diagram of a preferred upstream data slot transmitted by a selected network unit in response to a ranging permit.

Referring to FIG. 8, the varying upstream transmission distances between respective NUs 26 of the network 20 is compensated for by employing a calculated upstream transmission delay at each respective NU 26, depending on its respective distance from the headend 22. In this manner, the respective upstream data slots 52 (and frames 58) will arrive serially at the headend 22, i.e., without interfering with each other. This transmission delay compensation is accomplished by the HEMAC 28 in two initial steps: "coarse" ranging during an initial sign-on response framing slot, and "fine" ranging by way of a ranging permit 180. The calculated delay period is transmitted to the respective, and is subject to ongoing evaluation and adjustment by the HEMAC 28 via the "delay counter" field (e.g., 112 and 122 in FIG. 5).

In particular, in addition to assigning a ten-bit logical ID in response to the out-of-band sign-on signal from a newly active NU 26, the HEMAC 28 will also supply a coarse ranging transmission delay count in the responsive OAM/control field 68, based on the time delay measured at the HEMAC 28 between the transmission of the initial polling frame slot and the receipt of the respective out-of-band reply signal. Then, in order to "fine tune" the delay of the respective NU 26, the HEMAC 28 transmits a ranging permit 180 to more accurately determine (and subsequently adjust) the exact in-band round trip transmission interval between the two respective entities.

Figure 8A:
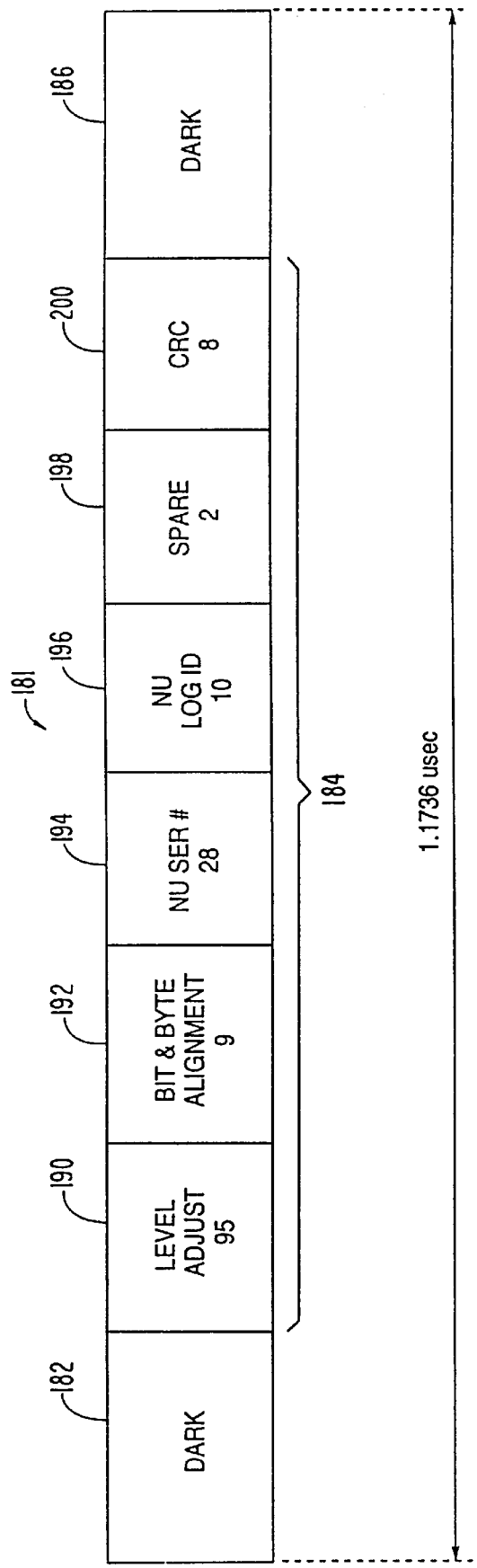
FIG. 8A is a more detailed block diagram of the preferred upstream data slot depicted in FIG. 7.

To respond to a ranging permit 180, the polled NU 26 transmits an upstream ranging slot 181, which comprises a front-end guard ("dark") period 182, followed by a response header 184, and then a back-end guard period 186. As will be apparent to those skilled in the art, the respective front and back end guard periods help ensure that the response header 184 does not accidentally overlap with the immediately preceding or following upstream transmission slots 52 of other NUs 26. As seen in FIG. 8A, the response header 184 includes a ninety-five bit (expanded) level adjustment signal field 190, followed by a nine bit alignment field 192, a twenty-eight bit NU Physical ID field 194, a ten-bit logical ID field 196, a two bit spare field 198 and an eight bit CRC field 200, respectively, with the front and back end guard periods 182 and 186 each taking one hundred ninety-four bit counts to fill the five hundred forty bit response slot 181.

The HEMAC 28 tracks the time between when it transmits the downstream ranging permit 180 and when it receives the response header 184 within in the ranging slot 181, compares the round trip transmission time against the currently existing maximum delay time, and calculates the difference in order to set the proper delay for the respective NU 26, which is transmitted to the particular NU 26 as part of the OAM/control field 68 in an ensuing downstream framing slot 60.

By way of further illustration, referring to FIG. 9, a downstream frame 48 is transmitted from the headend 22 and is received at NU#x after a transmission interval of $T_x$, and is received at NU#y after a transmission interval of $T_y$. NU#x imposes a delay of $T_{delx}$, and NU#y imposes a delay of $T_{dely}$, respectively, before each transmits a respective upstream slot response 52x and 52y, e.g., to an ATM permit contained in the respective downstream frame. Based on the ranging permit process, the HEMAC 28 sets the respective delays, $T_{delx}$ and $T_{dely}$, such that the total round trip transmission time is the same for both NU#x nd NU#y, i.e., $2T_x + T_{delx} = 2T_y + T_{dely}$.

In this manner, all upstream slots 52 (and, thus, upstream frames 58) will arrive serially at the headend 22, regardless of the differences in round trip transmission times between respective NUs 26. Where the transmission interval of a respective NU 26 is found to exceed the previous maximum delay time, the HEMAC will accordingly update each of the NUs 26 with a compensating delay value equal to or greater than the new maximum network terminal delay interval.

Figure 10:
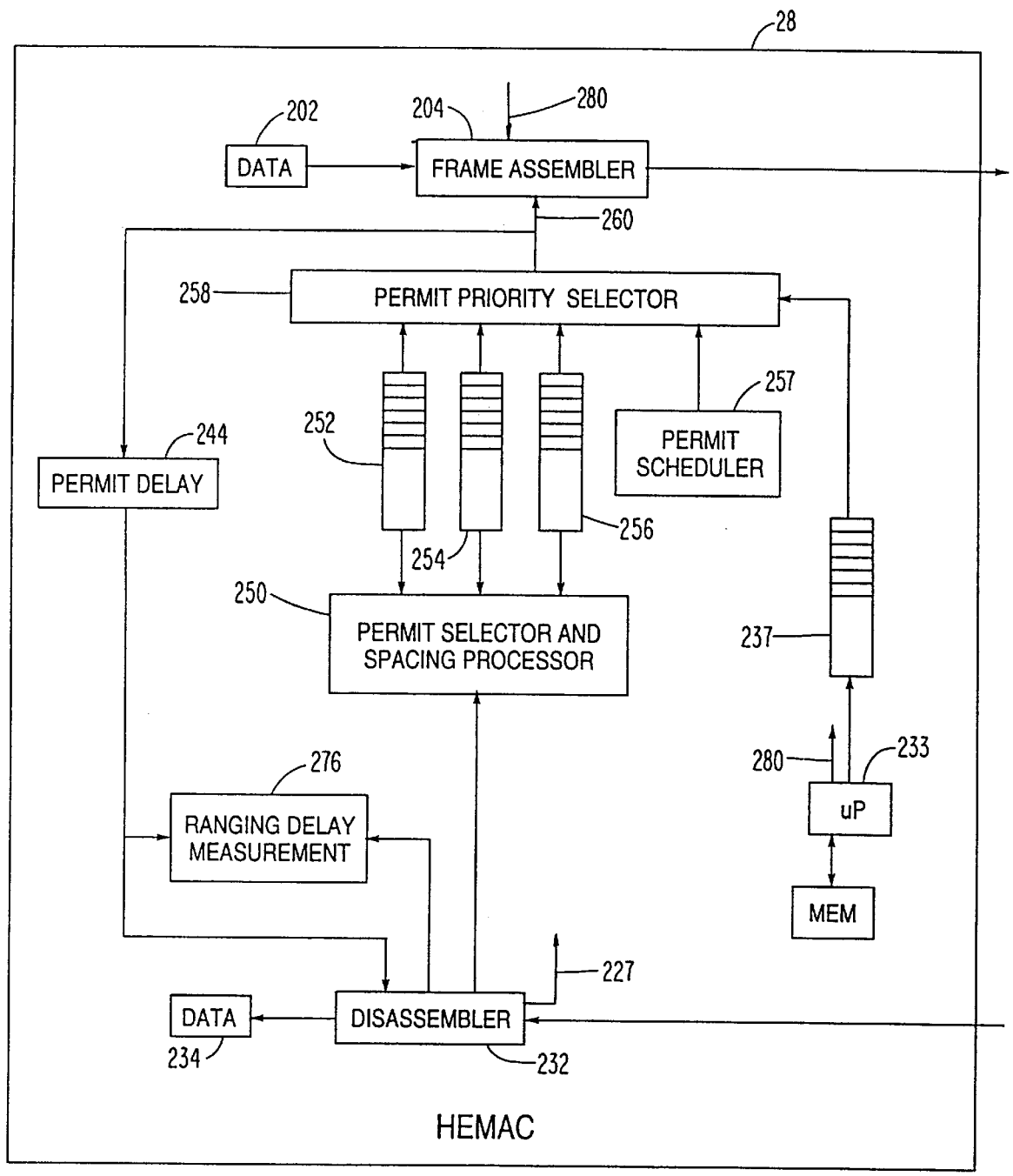
FIG. 10 is a functional block diagram of respective headend and NU MAC controllers in the PON of FIG. 1, illustrating the process for allocating transmission permits to respective NUs and upstream requests to the headend facility.
Figure 10A:
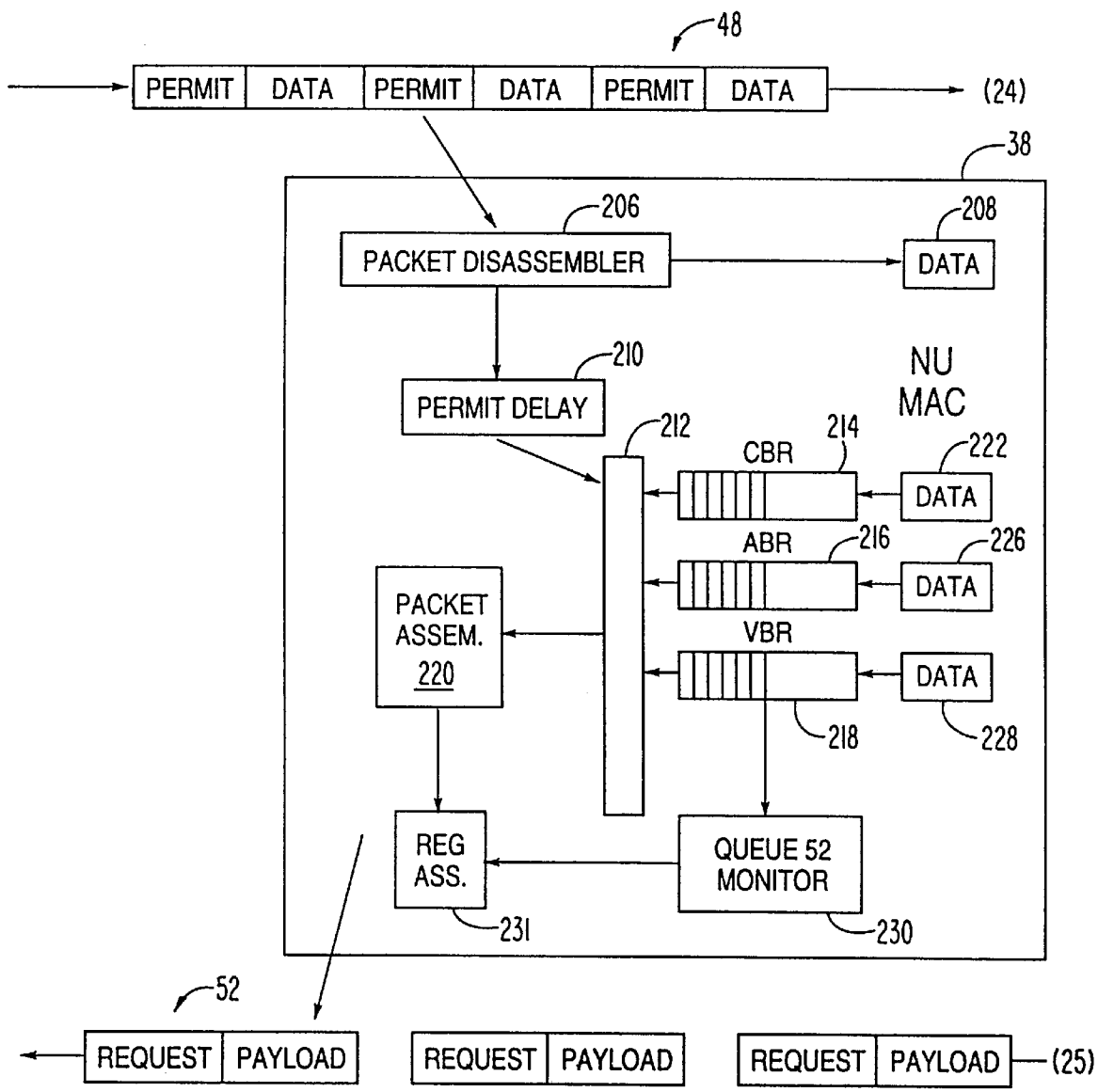

Referring to FIG. 10, the HEMAC 28 receives one or more downstream digital data streams 202 from various upstream interfaces such as, e.g., the synchronous telephony interface 30, the ATM interface 32 and the digital baseband services interface 34, respectively, (shown in FIG. 1), for downstream transmission to the active network NUs 26. The respective data streams 202 are fed into a headend frame assembler 204, which, in accordance with the framing protocol described above in conjunction with FIGS. 2–5, assembles the received data into respective downstream data frames 48 for transmission over the downstream fiber network 24. The assembler 204 also receives framing slot and MAC overhead permit information, 280 and 260, respectively, for inclusion in the respective downstream data frames 48.

As each downstream data frame 48 is received by a respective NU MAC 38, the frame 48 is input into a dissembler 206, which separates the respective framing slot information 60 and MAC overhead bytes 50, and then evaluates the VPI and VCI fields in each of the ATM slots to determine whether it is an intended recipient of the payload cells. Those ATM cells that are intended for the respective NU 26 are parsed into a data stream 208 for further processing (not shown). The NT MAC 38 also evaluates the NU physical ID field 62 of each framing slot 60 to determine whether it is the recipient of information carried in the respective the OAM/Control fields 68.

The NT MAC 38 evaluates the respective permit fields located in the MAC overhead bytes 50 to see if it is an intended recipient of a respective ATM permit 130, group polling permit 160, or ranging permit 180, respectively, by reading the respective permit type and logical ID fields (e.g., fields 110 and 116 in the exemplary permit 104 illustrated in FIG. 5). If the NT 26 is a recipient, the recovered permit type is input into a ranging delay circuit 210. In a manner described above in conjunction with FIGS. 8–9, the ranging delay circuit 210 delays the permit data within the NU MAC 38 for a selected time period, such that the responsive upstream transmission of a response slot 52 is coordinated with the respective upstream slot interval timing i.e., with each upstream slot 52 timed to arrive at the headend 22 in intervals of 1/72nd of 125 $\mu$sec, or every 1.736 $\mu$sec. Notably, if the permit is a group block polling permit 160, the delay circuit 210 must include an additional pertinent delay i.e., equal to 1/9 of a further 1.736 $\mu$sec interval times its respective transmission number within its polling group, so that the responsive mini-slot 161 is transmitted in its proper order within the upstream polling group slot 163.

Following the delay period, the permit is input into an upstream transmission controller 212., which immediately triggers the upstream transmission of a responsive upstream data slot 52 (or mini-slot 161) by an NU MAC packet assembler 220, depending upon the type of upstream response called for by the respective permit. More particularly, within the NU MAC 38 are a plurality of ATM service priority cell queues, including a CBR queue 214, an ABR queue 216 and a VBR queue 218, respectively. The CBR queue 214 assembles respective ATM cells containing (e.g.) low CDV service data such as synchronous telephony PCM data 222 from telephony channels supported by the respective NU 26. Likewise, the ABR queue 216 assembles and stores ATM cells containing upstream digital ABR service data 226 and the VBR queue 218 assembles and stores ATM cells containing upstream digital VBR service data 228, respectively.

Respective upstream slots 52 are populated as follows:

When responding to an ATM permit 130, respective counters (not shown) in a queue size monitor 230 monitor the CBR, ABR and VBR service queues 214, 216 and 218, tracking the number of pending ATM cells awaiting upstream transport in each respective queue. The counters provide an updated cell count to a request slot assembler 231 for each respective service type queue. The request slot assembler 231 uses this information to populate the respective "queue size" fields in the next outgoing ATM slot 132, i.e., wherein the generic queue type and size fields 148 and 149 are used to transmit the ABR queue status. In alternate preferred embodiments, the respective "generic queue" fields 148 and 149 may be used by the NU MAC 38 to send information to the HEMAC 28 regarding any number of different service type queues, either on a dedicated or alternating basis, depending upon available upstream bandwidth and service type priority. Upstream transmission of a mini-slot 161 in response to a block polling permit 160 is similar, except that not ATM cell is transmitted by the NU packet assembler 220.

As will be apparent from the present disclosure to those skilled in the art, up to sixteen different service priority types of ATM cells may be identified in the generic field 148 in accordance with the transmission protocol methodology provided herein, limited only by the available upstream bandwidth of the particular upstream channel assigned to the respective NU 26. Because of their relatively high priority service levels, CBR and VBR services are preferably given a dedicated queue field in the respective upstream requests.

The respective upstream data slots 52 are received by the HEMAC 28 and input into a frame disassembler 232, which strips the respective request fields from any ATM payload data 234 and/or OAM information (not shown) contained in each upstream slot 52. In accordance with a more particular aspect of the invention, a copy of each permit field 260 input into the downstream frame assembler 204 is delayed by respective HEMAC delay circuitry 244, and input into the frame disassembler 232, respectively. The HEMAC delay circuitry 244 delays the each successive permit field 260 to match to overall round-trip transmission timing of the PON 20 i.e., such that each respective request fields will arrive at the frame disassembler 232 at the same time as the permit field 260.

By comparing the respective permit and request fields, the frame disassembler 232 extracts the pertinent ATM cell queue data contained in each received request slot, which is input into a permit selector and spacing processing 250 for further processing by the HEMAC 28. Where a ranging response slot 181 is received, the disassembler signals a ranging delay measurement circuit 246, which measures the overall transmission time based on when the respective ranging permit information 260 was fed into the downstream frame assembler 204. The delay measurement is then relayed to a HEMAC processor 233 for further handling.

Figure 11:
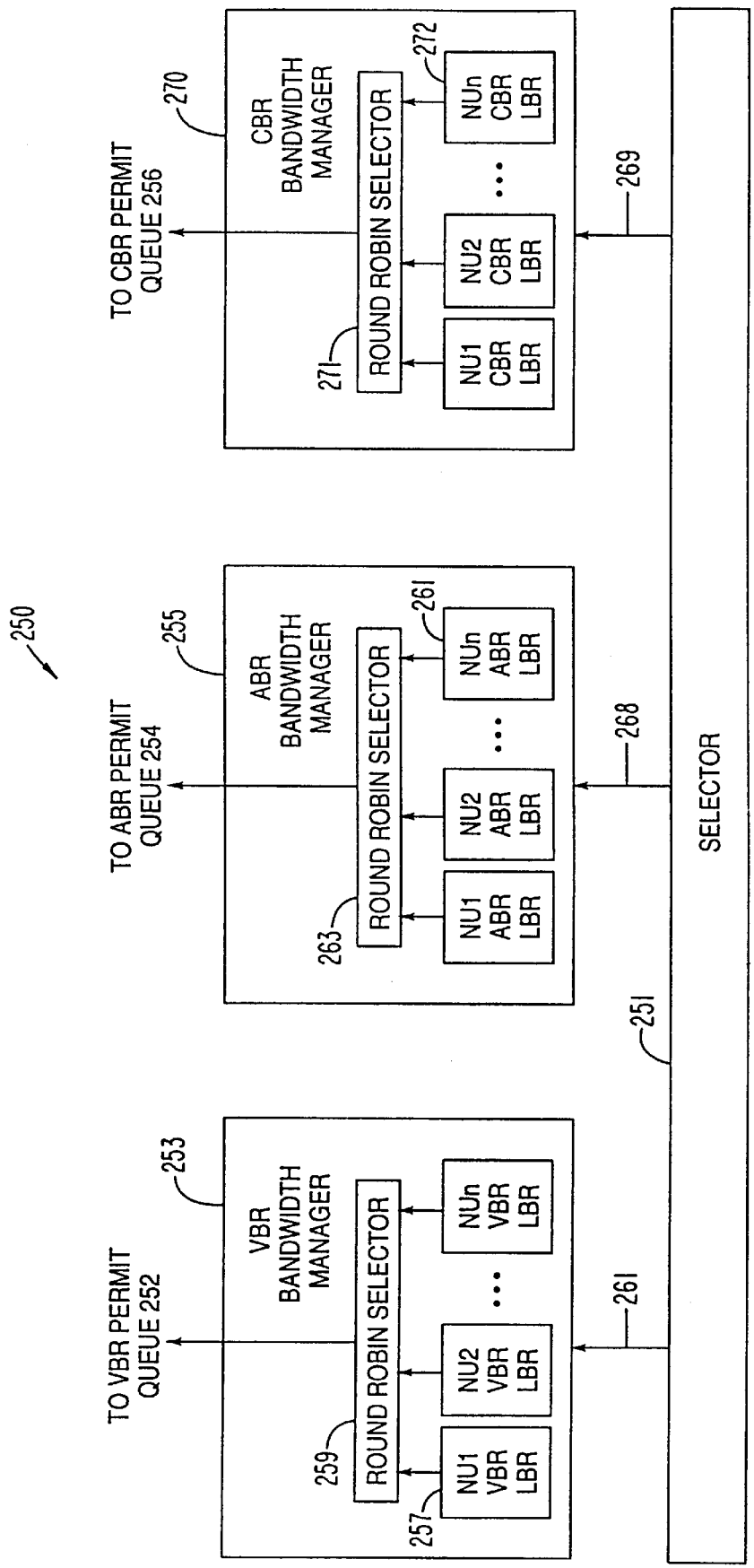
FIG. 11 is a functional block diagram of a preferred permit selector and spacing processor for use in the headend MAC controller of FIG. 10.

Referring to FIG. 11, the respective NU request field information input into the permit selector and spacing processor 250 is first sorted by a selector circuit 251, which separates the requests based on service type and NU logical ID. In particular, the respective VBR information 267 is parsed into a VBR bandwidth manager 253, wherein the VBR queue size for each NU 26 is placed into a respective VBR "leaky bucket" register ("LBR") 257. Likewise, ABR queue information 268 is parsed into an ABR bandwidth manager 255, with the ABR queue size for each NU 26 placed into a respective ABR LBR 261, and the CBR queue information 269 is parsed into size for each NU 26 is placed into a respective ABR LBR 261.

Within the respective bandwidth managers 253, 255 and 270, permits for different NUs 26 of the same service priority type are allocated on a "round robin" basis by selectors 259, 263 and 271, respectively. In particular, round robin selector 259 in the VBR bandwidth manager 253 successively issues a "VBR" type permit into a VBR permit queue 252 for each successive NU LBR 257 having at least one VBR cell waiting in queue; round robin selector 263 in the ABR bandwidth manager 255 successively issues a "VBR" type permit into a ABR permit queue 254 for each successive NU LBR 261 having at least one ABR cell in queue; and round robin selector 2271 in the CBR bandwidth manager 270 successively issues a "CBR" type permit into a CBR permit queue 254 for each successive NU LBR 261 having at least one CBR cell in queue. In this manner, each NU 26 having at least one ATM cell in a respective VBR, ABR or CBR service type is given an equal allocation of the available upstream bandwidth for that respective service priority, even though other NUs 26 may have a much larger queue size.

In particular, the respective LBR registers 257, 261 and 272 act as a "gate" for the incoming request information. Whenever a request arrives from a respective NU 26, the associated LBRs 257, 261 and 272 are incremented by the number of new ATM cells in each respective service priority queue of the transmitting NU 26. In a presently preferred embodiment, the respective LBRs 257, 261 and 272 are decremented at a selected mean rate allocated to that particular NU 26. The individual LBRs 257, 261 and 272 are each defined by a top threshold, or "burst size." So long as the respective LBR queue register is below this threshold, all incoming requests are allowed to into the respective permit queues 252, 254 or 256, respectively. If the threshold is exceeded, however, no further permits are issued until the respective LBR "leaks" below the threshold.

Referring again to FIG. 10, a permit priority selector 258 feeds the respective permits from the VBR, ABR and CBR permit queues 252, 254 and 256 to the downstream frame assembler 204. Occasional block polling and ranging permits (i.e., 160 and 180) issued directly from processor 233 into a separate queue 237 are also input into the downstream assembler 204 frames by the priority selector 258. CBR permits from queue 256 are given top priority by the priority selector 258, due to the very low CDV that must be maintained for these services, followed by VBR and ABR permits from queues 252 and 254, with group polling and ranging permits from queue 137 typically given the lowest priority. A permit scheduler 259 is also employed in conjunction with the permit priority selector 258, wherein the permit scheduler will override the "regular" permit priority order and direct certain permits to be issued on a "scheduled" basis, e.g., block polling permits or regular CBR permits to ensure that low CDV telephony packets are delivered upstream in a timely manner.

While embodiments and applications of this invention have been shown and described, as would be apparent to those skilled in the art, many more modifications and applications are possible without departing from the inventive concepts herein.

The scope of the disclosed inventions, therefore, are not to be restricted except in the spirit of the appended claims.

What is claimed:

1. A point-to-multipoint optical communication network, comprising:

a headend; and a plurality of network units in communication with the headend over respective downstream and upstream optical networks, the headend transmitting downstream data in successive downstream frames over the downstream optical network at a selected frame transmission interval, the network units transmitting upstream data in respective upstream slots over the upstream optical network, the upstream slots forming successive upstream frames received at the headend at the frame transmission interval, each downstream frame including a plurality of upstream transmission permits corresponding to respective upstream transmission slots of each upstream frame, each permit being one of a selected plurality of permit types, the respective permit types in each downstream frame being allocated by the headend at least in part based on demand information periodically received from respective network units, the respective permit types including a permit type authorizing an identified network unit to transmit an upstream bandwidth request as part of upstream data slot, the upstream bandwidth request including a first field identifying a first data queue in the respective network unit, a second field identifying a number of ATM cells waiting in the first data queue for upstream transmission, a third field identifying a second data queue in the respective network unit, and a fourth field identifying a number of ATM cells waiting in the second data queue for upstream transmission.

2. The communication network of claim 1, wherein the respective permit types further include a permit type authorizing an identified network unit to transmit an upstream ranging slot in response thereto.

3. The communication network of claim 2, wherein the headend assigns a selected upstream transmission delay to the identified network unit according to a calculated offset based on the time required to receive the upstream ranging slot at the headend.

4. The communication network of claim 1, wherein the respective permit types further include a permit type authorizing an identified network unit to transmit an upstream ATM cell in response thereto.

5. The communication network of claim 4, wherein the upstream ATM cell is transmitted as part of an upstream data slot containing the upstream bandwidth request.

6. The communication network of claim 1, wherein the respective permit types further include a permit type authorizing the transmission of a plurality of upstream bandwidth mini-slots each, mini-slot transmitted from one of a respective identified group of network units.

7. The communication network of claim 6, wherein the permit type is a group polling permit authorizing a preassigned group of network units to each transmit a respective mini-slot of a corresponding upstream data slot.

8. A point-to-multipoint optical communication network, comprising:

a headend; and a plurality of network units in communication with the headend over respective downstream and upstream optical networks, the headend transmitting downstream data in successive downstream frames over the downstream optical network at a selected frame transmission interval, the network units transmitting upstream data in respective upstream slots over the upstream optical network, the upstream slots forming successive upstream frames received at the headend at the frame transmission interval, each downstream frame including a plurality of upstream transmission permits corresponding to respective upstream transmission slots of each upstream frame, each permit being one of a selected plurality of permit types, wherein the headend comprises means for allocating permits based on information contained in received requests from respective network units, the means for allocating permits comprising a respective plurality of upstream bandwidth managers, each associated with a respective ATM service priority type.

9. The communication network of claim 8, wherein the respective plurality of upstream bandwidth managers each contain a plurality of leaky bucket registers ("LBRs"), each LBR of each upstream bandwidth manager associated with a respective network unit.

10. The communication network of claim 8, wherein information received in periodic upstream frame slots transmitted from respective network units includes a number of ATM cells awaiting upstream transmission from the respective network unit for each of one or more of the plurality of ATM service priority types, and wherein the respective number of waiting ATM cells for each respective service type is stored in the respective service type LBR associated with the network unit.

11. The communication network of claim 1, wherein the permit types transmitted in each respective downstream frame is based on a permit allocation process, the permit allocation process including a first criteria for issuing permits on a round robin basis and a second criteria for issuing permits on a scheduled basis.

* * * * *